(12) United States Patent
Rego et al.

(10) Patent No.: US 11,623,318 B2
(45) Date of Patent: Apr. 11, 2023

(54) METHOD FOR PROCESSING AN UNFINISHED OPTICAL LENS MEMBER

(71) Applicant: Essilor International, Charenton-le-Pont (FR)

(72) Inventors: Carlos Rego, Charenton-le-Pont (FR); Christophe Jeannin, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1240 days.

(21) Appl. No.: 16/086,394

(22) PCT Filed: Mar. 9, 2017

(86) PCT No.: PCT/EP2017/055573
§ 371 (c)(1),
(2) Date: Sep. 19, 2018

(87) PCT Pub. No.: WO2017/167564
PCT Pub. Date: Oct. 5, 2017

(65) Prior Publication Data
US 2020/0230775 A1  Jul. 23, 2020

(30) Foreign Application Priority Data
Mar. 29, 2016  (EP) .................................... 16305361

(51) Int. Cl.
*B24B 13/005* (2006.01)
*B29D 11/00* (2006.01)
(Continued)

(52) U.S. Cl.
CPC .......... *B24B 13/0055* (2013.01); *B24B 49/02* (2013.01); *B29D 11/00932* (2013.01);
(Continued)

(58) Field of Classification Search
CPC ........ B29D 11/00932; B29D 11/00961; B24B 13/0055; B24B 49/02; G02C 7/061; G02C 13/005
See application file for complete search history.

(56) References Cited

U.S. PATENT DOCUMENTS

2014/0320802 A1  10/2014  Muradore et al.
2015/0138501 A1   5/2015  Baudart et al.
(Continued)

FOREIGN PATENT DOCUMENTS

WO  WO 2013/072507 A1  5/2013
WO  WO 2014/013072 A1  1/2014
(Continued)

OTHER PUBLICATIONS

International Search Report dated Jun. 2, 2017 in PCT/EP2017/055573 filed Mar. 9, 2017.

*Primary Examiner* — Mathieu D Vargot
(74) *Attorney, Agent, or Firm* — Oblon, McClelland, Maier & Neustadt, L.L.P.

(57) ABSTRACT

A method implemented by computer for processing an unfinished optical lens member for manufacturing an optical lens, the unfinished optical lens member having an unfinished surface and an aspherical finished surface having a first reference system with a first reference point, and the optical lens to be manufactured including first and second surfaces, the first surface including a second reference system with a second reference point and included in the aspherical finished surface of the lens member, the method including: providing an unfinished optical lens member data; providing an optical function; providing a reference point position; providing an optical lens parameter; determining a reference system; determining a first surface dataset; and determining a second surface dataset.

14 Claims, 3 Drawing Sheets

(51) Int. Cl.
*B24B 49/02* (2006.01)
*G02C 7/06* (2006.01)
*G02C 13/00* (2006.01)

(52) U.S. Cl.
CPC ........ *B29D 11/00961* (2013.01); *G02C 7/061* (2013.01); *G02C 13/005* (2013.01)

(56) References Cited

U.S. PATENT DOCUMENTS

| | | |
|---|---|---|
| 2015/0328740 A1 | 11/2015 | Gacoin et al. |
| 2016/0114453 A1 | 4/2016 | Godot |

FOREIGN PATENT DOCUMENTS

| | | |
|---|---|---|
| WO | WO 2014/075924 A1 | 5/2014 |
| WO | WO 2015/000758 A1 | 1/2015 |
| WO | WO 2015/110432 A1 | 7/2015 |
| WO | WO 2015/158601 A1 | 10/2015 |

METHOD FOR PROCESSING AN UNFINISHED OPTICAL LENS MEMBER

FIELD OF THE INVENTION

The invention relates to a method implemented by computer means for processing an unfinished optical lens member for manufacturing an optical lens and a method for manufacturing an optical lens.

BACKGROUND OF THE INVENTION

An optical lens is generally manufactured in accordance with user specifications. In the case, for example, of an ophthalmic lens for the correction or improvement of eyesight, the ophthalmic lens is manufactured according to an user prescription corresponding to the visual requirements of that user. In addition, the shape and size of the spectacle frame supporting the ophthalmic lens is taken into account. At least one of the optical surfaces of the ophthalmic lens is processed to provide an ophthalmic lens according to the user prescription. The contour of the finished ophthalmic lens is edged according to the shape of the spectacle frame on which the ophthalmic lens is to be mounted.

An optical lens is generally manufactured from an unfinished optical lens member such as a semi-finished lens blank. A semi-finished lens blank generally has two opposing optical surfaces at least one of which is unfinished. The unfinished surface is typically the surface corresponding to the back surface of the optical lens which, in use, is orientated towards the eye of the user. The unfinished surface of the semi-finished lens blank is then processed according to the user's prescription to provide the required surface of the optical lens. An optical lens having finished back and front surfaces is often referred to as an uncut optical lens. The uncut optical lens is then edged according to a shape of a frame of the optical lens in order to obtain an edged or cut lens.

During processing of an optical lens, an optical reference point is defined on a surface, typically the finished surface, of the unfinished optical member to provide a reference for when the finished optical lens is installed on a frame.

Usually, the optical reference point is used as a reference point when processing the unfinished optical surface. The position and/or orientation of the process optical surface is of great importance when such surface is aspherical. For example, when the ophthalmic lens is a progressive additional lens, the position and orientation of the lens in the spectacle frame is of great importance for the visual benefit and comfort of the user.

Some unfinished optical members have a finished surface that is aspherical and therefore, the process optical surface is to be positioned and oriented relative to the finished surface so as to provide the desired optical function. Such position and orientation is usually done by using a reference point provided on the finished surface.

The reference point of the finished optical surface may not always have the optimum position and it may be preferable to reposition such reference point.

For example, in the case where the spectacle frame on which the optical lens is to be mounted is shaped such that the nasal and temporal distances, respectively defining the distance between the optical reference point and the nasal and temporal edges, have not identical values (differing for example from 5 mm), a semi-finished blank having a finished optical surface with a circular contour and a reference point located very close to the center of this circular contour, this leads to a selection of a semi-finished blank of significantly larger diameter, in order to be of sufficient size to enable an optical lens of the required size to be obtained. However, this leads to wastage of the optical material of the unfinished lens member.

One object of the present invention is to provide a new method for processing an unfinished optical lens member having an aspherical finished surface for manufacturing an optical lens that allows having the optimum reference point of the finished optical surface.

SUMMARY OF THE INVENTION

To this end, the invention proposes a method implemented by computer means for processing an unfinished optical lens member for manufacturing an optical lens, the unfinished optical lens member having an unfinished surface and an aspherical finished surface having a first reference system with a first reference point and the optical lens to be manufactured having a first and a second surfaces, the first surface comprising a second reference system with a second reference point and being comprised in the aspherical finished surface of the lens member, the method comprising:

an unfinished optical lens member data providing step (S2), during which a set of data for the lens member is provided, the data comprising at least an unfinished optical lens member dataset representative of the aspherical finished surface of the lens member in the first reference system;

an optical function providing step (S4), during which an optical function of the optical lens to be manufactured is provided;

a reference point position providing step (S6), during which a position of said second reference point on said first surface is provided;

an optical lens parameter providing step (S8), during which at least an optical lens parameter is provided;

a reference system determining step (S10), during which at least the position and/or orientation of a second reference system with respect to said first reference system is determined based at least on the optical lens parameter and/or on the set of data for the lens member by positioning and/or orienting the second reference system with respect to the first reference system;

a first surface dataset determining step (S12), during which at least a first surface dataset defining the first surface within the second reference system is determined based on the unfinished optical lens member dataset and/or the optical lens parameter; and a second surface dataset determining step (S14), during which for each determined first surface dataset, a second surface dataset defining the second surface within the second reference system is determined based on the dataset representative of the aspherical finished surface of the lens member and on the optical function of the optical lens to be manufactured.

Advantageously, the method of the invention allows repositioning an optical lens to be manufactured in an unfinished optical lens member having an aspherical finished surface.

According to further embodiments which can be considered alone or in combination:

the optical lens parameter providing step comprises an optical lens performance parameter providing step, during which a value of a performance parameter of said optical lens to be manufactured is provided; and the optical lens performance parameter providing step, the reference point position determining step, the first surface dataset determining step and the second surface dataset determining step are repeated so as to fulfilling a predefined criterion on the provided value of the optical lens performance parameter; and/or the optical lens parameter providing step comprises an optical lens performance parameter providing step, during which a value of a performance parameter of said optical lens to be manufactured is provided; and during the reference system position determining step, at least a plurality of positions of said second reference system with respect to the position of said first reference system are determined;

the method further comprises a final second surface dataset selecting step, during which a final second surface dataset defining the second surface to be processed is selected among the plurality of second surface datasets determined based on each of the plurality of determined positions of said second reference point and second system orientation and on each of the plurality of determined first surface datasets so as to fulfilling a predefined criterion on the provided value of the optical lens performance parameter; and/or the optical lens parameter comprises at least a contour data defining the contour of at least the first surface of the optical lens in a finished cut state, the contour data comprising at least:
  the maximum distance between two points of the contour of the first surface, and/or
  a projection on the aspherical surface of the contour of the first surface, and/or
  a three dimensional representation of the contour of at least the first surface; and/or the data related to the unfinished optical lens member further comprises a first contour data defining the contour of the unfinished surface and/or a second contour data defining the contour of the aspherical finished surface of the unfinished optical lens member; and/or the data related to the unfinished optical lens member further comprises a dataset representative of defects on the aspherical finished surface of the lens member; and/or the data related to the unfinished optical lens member further comprises a dataset representative of an optical element embedded in the unfinished optical lens member; and/or the optical element is an active optical element and/or a light conducting element; and/or the first reference point is the geometrical center of the aspherical finished surface; and/or the optical lens is an ophthalmic lens intended to be worn by a wearer, the ophthalmic lens being adapted to the wearer; and/or the contour data is determined from the geometry of the frame supporting the ophthalmic lens.

The invention further relates to a method of manufacturing an optical lens comprising:

an unfinished optical lens member providing step during which an unfinished surface and an aspherical finished surface having a first reference system is provided;

processing the unfinished optical lens member for manufacturing the optical lens according to the invention;

an unfinished surface machining step during which the unfinished surface is machined so as to obtain the second surface of the optical lens;

a marking step during which marks are formed upon the first and/or second surface of the optical lens.

According to an embodiment of the invention said marks are based on an information relative to the finished second surface and/or on an information relative to the orientation of the optical lens in a finished cut state with respect to the unfinished optical lens member.

The invention further relates to a computer program product comprising one or more stored sequences of instructions that are accessible to a processor and which, when executed by the processor, causes the processor to carry out the steps of the method according to the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method.

The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

The invention relates to a method, for example implemented by computer means, for processing an unfinished optical lens member for manufacturing an optical lens.

The unfinished optical lens member has an unfinished surface and an aspherical finished surface having a first reference system with a first reference point.

In the sense of the invention an "aspherical surface" is to be understood as a non-spherical surface without a rotational axis of symmetry.

Figure 1A:
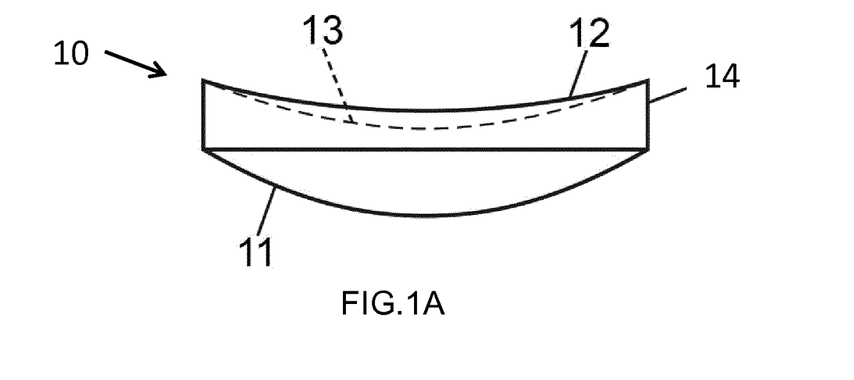
FIG. 1 is a side view of an unfinished optical lens member to be process by a method according to the invention.

As represented on FIG. 1A, unfinished optical lens member has a first optical face 11 and a second optical face 12. The first and second optical faces are connected by an external periphery surface 14.

Typically, the first optical face 11 has an aspherical finished surface associated with a first reference system. The second optical face 12 has an unfinished surface to be machined according at least to the prescription of the wearer.

In the example represented on FIG. 1A, the first optical face 11 corresponds to the front face of the optical lens member 10. In use of the resulting finished optical lens, the front face 11 is disposed nearest the object being viewed. However, the invention is not limited to such configuration and the first optical face 11 could be the back face and the second optical face the front face.

The optical lens member 10 may be obtained by molding or machining or additive manufacturing.

The optical lens to be manufactured has a first and a second surface.

The first surface is associated with a second reference system and is comprised in the aspherical finished surface 11 of the unfinished optical lens member.

The second face 13 represented by the dotted line on FIG. 1, is obtained by machining the unfinished surface of the unfinished optical lens member.

Figure 1B:
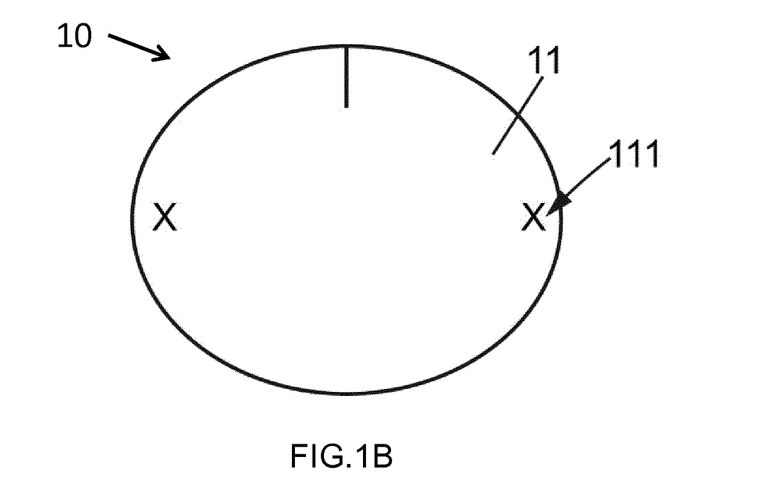

The first and second reference system may be identified by referencing elements 111 as illustrated on FIG. 1B.

In the sense of the invention, "referencing elements" may be understood as meaning that a skilled person can easily identify a reference point and the mains axis of the reference system from such element(s).

According to a further embodiment, the referencing element may be a reference to information stored in a data base. The operator may access to the data base and from the information comprised in the database identify a reference point and the mains axis of the reference system.

Figure 2:
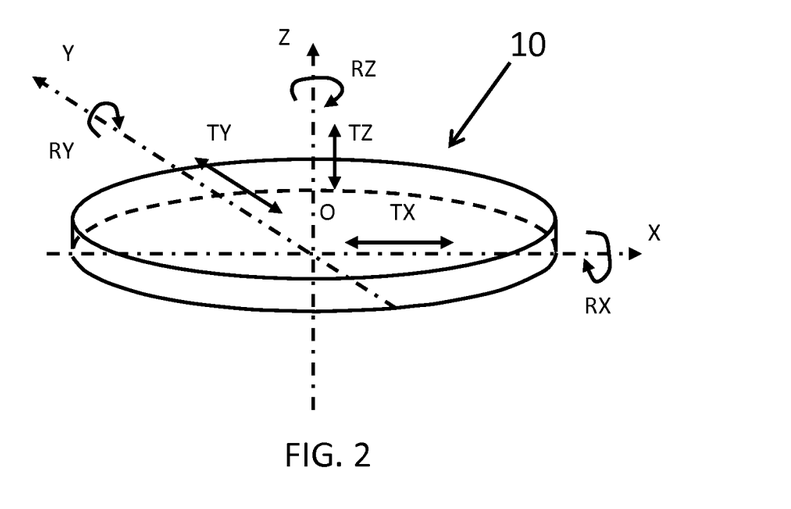
FIG. 2 is a perspective view of an optical lens member illustrating a referencing system and the positioning parameters.

As represented on FIG. 2, a reference system typically comprises a main axis Z perpendicular to a main plane (X, Y) defined by two axes X, Y perpendicular to each other and to the main axis Z. The reference system further comprises a reference point O defining the intersection of the axes X, Y and Z.

The position of the lens member, in particular of each optical surface of the lens member 10 in such reference system is defined by six parameters. Among the six parameters, three are translation parameters TX, TY and TZ along each axis X, Y, and Z and three are rotation parameters RX, RY, and RZ about each of the axis X, Y, and Z.

According to an embodiment of the invention, the first reference point of the first reference system is the geometrical center of the aspherical finished surface of the unfinished optical lens. The geometrical center may be obtained by projecting the barycenter of the external contour of the aspherical finished surface on said aspherical finished surface along the axis Z. If the external contour of the aspherical finished surface is not plane, said external may be projected on the plane XOY.

According to an embodiment of the invention, the first reference point of the first reference system may be the prism reference point.

Figure 3:
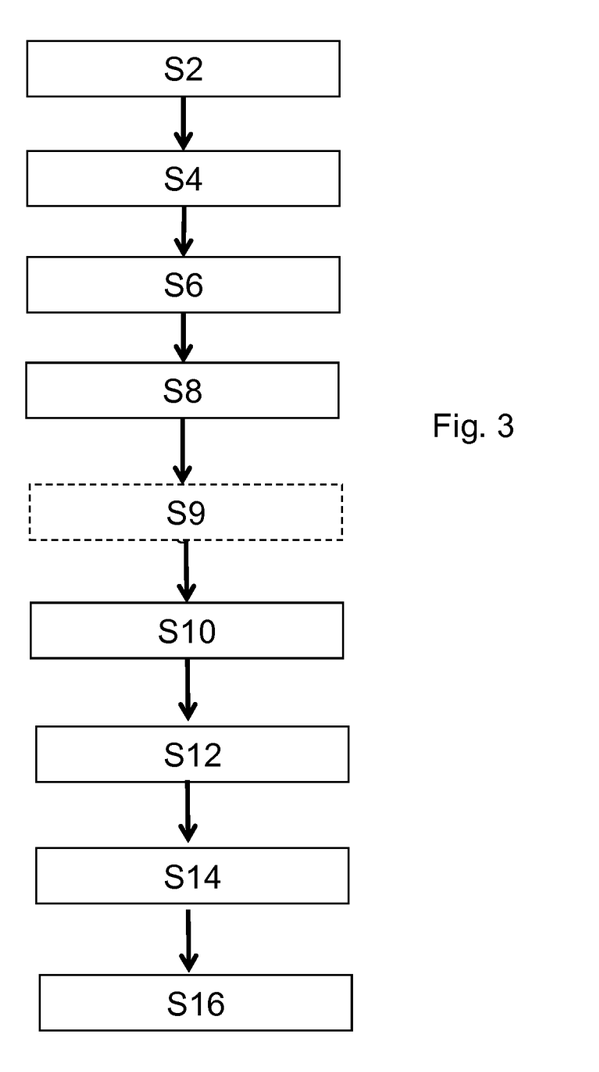
FIG. 3 is a flowchart of the steps of a method for processing an unfinished optical lens member for manufacturing an optical lens according to the invention.

As illustrated on FIG. 3, the method according to the invention comprises at least:
an unfinished optical lens member data providing step S2,
an optical function providing step S4,
a reference point position providing step S6,
an optical lens parameter providing step S8,
a reference system determining step S10,
a first surface dataset determining step S12, and
a second surface dataset determining step S14.

During the unfinished optical lens member data providing step S2, a set of data for the unfinished optical lens member is provided. The set of data comprises at least data representative of the aspherical finished surface of the unfinished optical lens member in the first reference system.

For example, the unfinished optical lens member may be provided with engraved markings on the finished face. The engraved markings define the reference system of the surface of the finished face of the unfinished optical lens member. Alternatively, the unfinished optical lens member may be provided with a sub-surface referencing element located between the first and second optical faces as disclosed in international patent applications WO2014/131879A1 and WO2014/131878 A1 filed by the applicant.

Typically, the set of data for the unfinished optical lens member comprises at least data representative of the surface design of the aspherical finished surface defined in the first reference system.

In the sense of the invention the "surface design" is the set of parameters that allows defining the surface of a face of an optical lens member. For example, the surface design may comprise the surface equation, position and orientation of the surface of a face of an optical lens member, such equation, position and orientation being defined in a reference system.

During the optical function providing step S4 an optical function of the optical lens to be manufactured is provide.

In the sense of the invention an optical function corresponds to a function providing for each gaze direction the effect of an optical lens on the light ray passing through the optical lens.

The optical function may comprise dioptric function, light absorption, polarizing capability, reinforcement of contrast capacity, etc. . . .

The dioptric function corresponds to the optical lens power (mean power, astigmatism etc. . . . ) as a function of the gaze direction.

According to a preferred embodiment of the invention the optical lens to be manufactured is an ophthalmic lens intended to be worn and adapted to a wearer. According to such embodiment the optical function provided during the optical function providing step is adapted to the prescription of the wearer and to given wearing conditions describing how the lens is positioned in front of the wearer eye.

The prescription is to be understood to mean a set of optical characteristics of optical power, of astigmatism, of prismatic deviation, and, where relevant, of addition, determined by an ophthalmologist or optometrist in order to correct the vision defects of the wearer, for example by means of a lens positioned in front of his eye. For example, the prescription for a progressive addition lens comprises values of optical power and of astigmatism at the distance-vision point and, where appropriate, an addition value. The prescription data may include data for emmetrope eyes.

During the reference point position providing step S6, a position of the second reference point of the second reference system on the first surface of the optical lens to be manufactured is provided.

The position of the second reference point may be offset relatively to the position of the first reference point. Advantageously, offsetting the second reference point may allow using the unfinished optical lens to manufacture an optical lens to be edged so as to fit a specific spectacle frame.

During the optical lens parameter providing step S8, at least an optical lens parameter is provided. The optical lens parameter relates to a parameter of the optical lens to be manufactured.

For example, the optical lens parameter may comprise contour data defining the contour of at least the first surface of the optical lens in a finished cut or edged state.

Such contour data may be obtained either by measuring a specific frame or by reference to frame data that comprises an indication of the contour data.

The contour data comprises at least:
 the maximum distance between two points of the contour of the first surface, and/or
 a projection on the aspherical surface of the contour of the first surface, and/or
 a three dimensional representation of the contour of at least the first surface.

For example, when the optical lens to be manufactured is an ophthalmic lens intended to be worn by a wearer, the contour data may be determined from the geometry of the frame intended to support the ophthalmic lens.

The optical lens parameter may relate to the 2D dimensions or shape of the spectacle frame in which the optical lens is to be mounted. For example to ensure that once machined and edged, the optical lens fits in the spectacle frame.

The optical lens parameter may relate to the 3D shape of the spectacle frame in which the optical lens is to be mounted. For example to ensure that once machined and edged the optical lens has a 3D shape that approximates the best of the 3D contour of the spectacle frame.

The optical lens parameter may relate to the optical distortion and/or magnification over the surface of the machined optical lens or at least over part of the surface of the machined optical lens. For example, the lens parameter may be a specific value for magnification or a need to reduce/increase magnification, locally or globally. In this case, the optical function can be reached while magnification is modified using a shift of the second reference relative to the reference point position. For example, shifting the second reference in a position where the finished surface curvature is different from the curvature at the reference point position will change magnification. Also, distortion being a dependant on the geometry of the first surface and second surface of the finished lens, the shift of the second reference will thus impact distortion, while optical function can be reached.

During the reference system determining step S10, at least the position and/or orientation of a second reference system with respect to said first reference system is determined. The position of the second reference system is determined based at least on the optical lens parameter and/or on the set of data for the lens member by positioning and/or orienting the second reference system with respect to the first reference system.

According to some embodiment of the invention, the second reference point may be the same as the first reference point. For example, if the first surface of the optical lens to be manufacture corresponds to a rotation Rz of the aspherical finished surface of the unfinished optical lens member according to Z axis.

A first surface dataset defining the first surface of the optical lens to be manufactured within the second reference system is determined during the first surface dataset determining step S12.

The first surface dataset is determined based on the unfinished optical lens member dataset and/or the optical lens parameter.

During the second surface dataset determining step S14, for each determined first surface dataset, a second surface dataset defining the second surface within the second reference system is determined. The second surface dataset is determined based on the dataset representative of the aspherical finished surface of the lens member and on the optical function of the optical lens to be manufactured.

Advantageously, the method according to the invention allows determining the surface to be machined on the unfinished surface of an aspherical unfinished optical member so as to provide an optical lens having a given optical function upon changing the position and/or orientation of the aspherical finished surface of the unfinished optical member.

According to an embodiment of the invention, the second reference system may be determined with a tolerance on the optical function. Such tolerance may be expressed for a set of gaze direction in terms of difference in optical power or astigmatism level. According to an embodiment, the tolerance may be substantially zero so that the optical function is substantially the same as the one provided during the optical function providing step.

According to an embodiment of the invention, the optical lens parameter may relate to the optical performance of an optical viewing area of the machined optical lens. It may for example be preferable to lower the optical design of a few millimeters to give access to a viewing zone far more open. Changing the position and/or orientation of the first reference system may help improving the optical and/or manufacturing performance of the manufactured optical lens.

Changing the position and/or orientation of the aspherical finished surface of the unfinished optical member may be useful to assure that the manufactured optical lens may fit the spectacle frame selected by the wearer.

For example, the data related to the unfinished optical lens member provided during the unfinished optical lens member data providing step S2 may comprise a first contour data defining the contour of the unfinished surface and/or a second contour data defining the contour of the aspherical finished surface of the unfinished optical lens member.

The method according to the invention may also be used when the aspherical finished surface has a defect in a zone that should be part of the optical lens. Indeed, the method of the invention may be used to change the position and/or orientation of the aspherical finished surface so that the defect does not appear on the finished optical lens.

For example, the data related to the unfinished optical lens member provided during the unfinished optical lens member data providing step S2 may further comprise a dataset representative of defects on the aspherical finished surface of the lens member, such as an indication of the position and/or size of a defect zone.

The method according to the invention may also be used when the unfinished optical lens member comprises an optical element embedded, such as an active optical element and/or a light conducting element and/or a hologram film and/or a diffractive element. Indeed the position of such element in the finished optical may be of great importance and may need to be personalized for each wearer.

The method of the invention may be used to change the position and/or orientation of the optical element embedded since the method allows compensating to a change of position and/or orientation of the aspherical finished surface. For example, the second reference point may be shifted to that the position of the optical element may be positioned at a customized position according to the wearer eye when the lens is worn. For example, it may be necessary to adjust the position of a light guide element relative to the eye, so as to optimize the visibility of an image generated by the embedded optical element by the wearer.

The unfinished optical lens member may comprise an embedded polarization film. The method of the invention may be used to change the position of the embedded polarization film since the method allows compensating to a change of position of the aspherical finished surface. Advantageously, the orientation of the polarization film is unchanged so as to maintain the polarization orientation.

For example, the data related to the unfinished optical lens member provided during the unfinished optical lens member data providing step S2 may further comprise a dataset representative of an optical element embedded in the unfinished optical lens member.

As illustrated on FIG. 3, the method according to the invention may comprise further to the optical lens parameter providing step S8, an optical lens performance parameter providing step S9, during which a value of a performance parameter of said optical lens to be manufactured is provided.

According to an embodiment of the invention, the optical lens performance parameter providing step S9, the reference system position determining step S10, the first surface dataset determining step S12 and the second surface dataset determining step S14 may be repeated so as to fulfilling a predefined criterion on the provided value of the optical lens performance parameter.

Furthermore, during the reference system determining step S10, a plurality of positions and/or orientation of the second reference system with respect to the first reference system are determined.

As illustrated on FIG. 1, the method may further comprise a final second surface dataset selecting step S16. During the final second surface dataset selecting step S16 a final second surface dataset defining the second surface to be processed is selected among the plurality of second surface datasets. The plurality of second surface datasets are determined based on each of the plurality of determined positions and/or orientation of the second reference system and on each of the plurality of determined first surface datasets so as to fulfilling a predefined criterion on the provided value of the optical lens performance parameter.

According to a first example of implementation the method of the invention may be used to ensure that the edged machined optical lens fits in a preselected spectacle frame.

During the unfinished optical lens member data providing step, the first aspherical surface of the unfinished optical lens member is provided.

The following example deals with the case of a classic progressive design where the diameter of the unfinished optical lens is too small to fit in the spectacle frame contour The wearer prescription and the desired optical design are provided. Fitting parameters relating to the how the edged optical lens is to be fitted in the spectacle frame may be provided.

An unfinished optical lens member is then select based to these fitting parameters. The diameter of the unfinished optical lens member and the aspherical surface in a first reference system are then known.

So as to ensure that it is possible to edge the machined optical lens so as to fit the preselected spectacle frame, contour data are provided.

Typically, the contour data may comprise the bounding box of the contour of the spectacle frame defined by a width A and a height B.

A new orientation and/or position of the reference system of the finished surface are determined so as to assure that the machined optical lens fits the preselected spectacle frame.

By default, the first reference point of the first reference system of the finished surface of the unfinished optical lens is with micro prints. The first reference point is usually a point located 4 mm above the center of these micro prints.

Optionally defining the optical meridian gives the positions of the initial reference point for far and near distances vision.

The second reference point of the second reference system is determined by repositioning in the main plan X,Y, for example in terms of displacement dX, dY with respect to the position of the first reference point.

These amounts dX/dY may for example be determined by successive tests:
One varies dX or dY of an increasing amount
for each value (dX, dY) the fitting of the optical lens in the preselected spectacle frame is checked,
the process is stopped for example when it is determined that the machined optical lens fits in the preselected spectacle frame.

During the second dataset determining step the second surface of the optical is determined based on the second reference system of the finished optical lens and the optical function to be provided.

Such determination may be done by optimization for example using an optimization method as disclosed in WO2007/017766.

The invention also relates to a method of manufacturing an optical lens.

Figure 4:
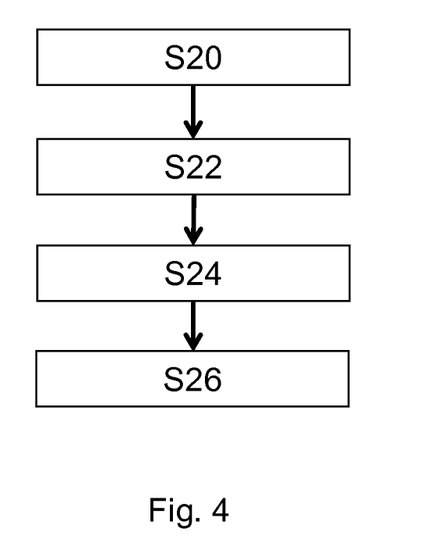
FIG. 4 is a flowchart of the steps of a method for manufacturing an optical lens according to the invention.

As illustrated on FIG. 4, the method of manufacturing an optical lens comprises:
an unfinished optical lens member providing step S20,
a processing step S22,
an unfinished surface machining step S24, and
a marking step S26.

During the unfinished optical lens member providing step S20, an unfinished surface and an aspherical finished surface having a first reference system are provided.

The unfinished optical lens member for manufacturing the optical lens is processed during the processing step S22 according to a method of the invention.

The unfinished surface is machined so as to obtain the second surface of the optical lens during the unfinished surface machining step S24.

The machining may include any known machining methods, such as grinding, polishing, additive manufacturing.

During the marking step S26, marks are formed upon the first and/or second surface of the optical lens so as to allow an easy positioning and orientation of the optical lens when edging and/or fitting in the spectacle frame.

For example, the marks are based on information relative to the finished second surface and/or on information relative to the orientation of the optical lens in a finished cut state with respect to the unfinished optical lens member. The marks may be used for performing edging operations on the unfinished optical lens member.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by computer for processing an unfinished optical lens member for determining the surface to be machined on a unfinished surface of an aspherical unfinished optical member to provide an optical lens having a given optical function upon changing the position and/or orientation of the aspherical finished surface of the unfinished optical member, the unfinished optical lens member including an unfinished surface and an aspherical finished surface including a first reference system with a first reference point and the optical lens to be manufactured including first and second surfaces, the first surface including a second reference system with a second reference point and included in the aspherical finished surface of the lens member, the method comprising:

providing an unfinished optical lens member data, during which a set of data for the lens member is provided, the data comprising at least an unfinished optical lens member dataset representative of the aspherical finished surface of the lens member in the first reference system;

providing an optical function, during which an optical function of the optical lens to be manufactured is provided;

providing a reference point, during which a position of the second reference point on the first surface is provided;

providing an optical lens parameter, during which at least an optical lens parameter is provided, the optical lens parameter is distinct from the optical function of the optical lens;

determining a reference system, during which at least the position and/or orientation of the second reference system with respect to the first reference system is determined based at least on the optical lens parameter and/or on the set of data for the lens member by positioning and/or orienting the second reference system with respect to the first reference system;

determining a first surface dataset, during which at least a first surface dataset defining the first surface within the second reference system is determined based on the unfinished optical lens member dataset and/or the optical lens parameter; and determining a second surface dataset, during which for each determined first surface dataset, a second surface dataset defining the second surface within the second reference system is determined based on the dataset representative of the aspherical finished surface of the lens member and on the optical function of the optical lens to be manufactured.

2. The method according to claim 1, wherein:

the providing the optical lens parameter comprises providing an optical lens performance parameter, during which a value of a performance parameter of the optical lens to be manufactured is provided; and the providing the optical lens performance parameter, the determining the reference point position, the determining the first surface dataset, and the determining the second surface dataset are repeated to fulfilling a predefined criterion on the provided value of the optical lens performance parameter.

3. The method according to claim 1, wherein:

the providing the optical lens parameter comprises providing an optical lens performance parameter, during which a value of a performance parameter of the optical lens to be manufactured is provided; and during the determining the point reference system position, at least a plurality of positions and/or orientations of the second reference system with respect to the first reference system are determined;

the method further comprises selecting a final second surface dataset, during which a final second surface dataset defining the second surface to be processed is selected among the plurality of second surface datasets determined based on each of the plurality of determined positions and/or orientations of the second reference system and on each of the plurality of determined first surface datasets to fulfilling a predefined criterion on the provided value of the optical lens performance parameter.

4. The method according to claim 1, wherein the optical lens parameter comprises at least a contour data defining the contour of at least the first surface of the optical lens in a finished cut state, the contour data comprising at least:

maximum distance between two points of the contour of the first surface, and/or a projection on the aspherical surface of the contour of the first surface, and/or a three dimensional representation of the contour of at least the first surface.

5. The method according to claim 1, wherein the data related to the unfinished optical lens member further comprises a first contour data defining the contour of the unfinished surface and/or a second contour data defining the contour of the aspherical finished surface of the unfinished optical lens member.

6. The method according to claim 1, wherein the data related to the unfinished optical lens member further comprises a dataset representative of defects on the aspherical finished surface of the lens member.

7. The method according to claim 1, wherein the data related to the unfinished optical lens member further comprises a dataset representative of an optical element embedded in the unfinished optical lens member.

8. The method according to claim 7, wherein the optical element is an active optical element and/or a light conducting element.

9. The method according to claim 1, wherein the first reference point is the geometrical center of the aspherical finished surface.

10. The method according to claim 4, wherein the optical lens is an ophthalmic lens to be worn by a wearer, the ophthalmic lens adapted to the wearer.

11. The method according to claim 10, wherein the contour data is determined from geometry of a frame supporting the ophthalmic lens.

12. A method of manufacturing an optical lens, comprising:

providing an unfinished optical lens member during which an unfinished surface and an aspherical finished surface having a first reference system is provided;

processing the unfinished optical lens member for manufacturing the optical lens according to claim 1;

machining an unfinished surface during which the unfinished surface is machined to obtain the second surface of the optical lens;

a marking during which marks are formed upon the first and/or second surface of the optical lens.

13. The method according to claim 12, wherein the marks are based on an information relative to the finished second surface and/or on an information relative to the orientation of the optical lens in a finished cut state with respect to the unfinished optical lens member.

14. A non-transitory computer-readable storage medium storing instructions of a computer program product for a programmable apparatus, the computer program product comprising a sequence of instructions for implementing a method according to claim 1 when loaded into and executed by the programmable apparatus.

* * * * *